United States Patent
Soukka et al.

(10) Patent No.: US 9,769,105 B2
(45) Date of Patent: Sep. 19, 2017

(54) RUNWAY CHAT

(71) Applicant: General Instrument Corporation, Horsham, PA (US)

(72) Inventors: Leonard Soukka, Linkoping (SE); Henrik Lindmark, Norrkoping (SE); Susanne Ulltjarn, Mantorp (SE)

(73) Assignee: ARRIS Enterprises, Inc., Suwanee, GA (US)

( * ) Notice: Subject to any disclaimer, the term of this patent is extended or adjusted under 35 U.S.C. 154(b) by 428 days.

(21) Appl. No.: 14/210,362

(22) Filed: Mar. 13, 2014

(65) Prior Publication Data
US 2014/0280649 A1    Sep. 18, 2014

Related U.S. Application Data

(60) Provisional application No. 61/800,992, filed on Mar. 15, 2013.

(51) Int. Cl.
*H04L 12/58* (2006.01)

(52) U.S. Cl.
CPC .................................. *H04L 51/24* (2013.01)

(58) Field of Classification Search
CPC ........... H04N 21/4788; H04N 21/4307; H04N 21/4316; H04N 21/4722; H04N 21/4312; H04N 21/4622; H04N 21/4756; H04N 21/4782; H04N 21/4825; H04N 21/8456; H04N 21/8547; H04N 5/44591; H04L 12/588; G06Q 50/01; G06F 17/30056; G06F 17/30861
See application file for complete search history.

(56) References Cited

U.S. PATENT DOCUMENTS

| | | | |
|---|---|---|---|
| 8,074,251 B2 | 12/2011 | Aoki et al. | |
| 8,312,500 B2 | 11/2012 | Emerson et al. | |
| 8,335,833 B1 * | 12/2012 | Parkinson | H04N 21/4882 709/204 |
| 8,438,595 B1 * | 5/2013 | Kannan | G11B 27/322 725/32 |
| 8,554,861 B2 | 10/2013 | Christie et al. | |
| 8,561,118 B2 | 10/2013 | Flynn-Ripley et al. | |

(Continued)

OTHER PUBLICATIONS

V. Lavrusik, "Improving Conversations on Facebook with Replies", retrieved from URL <https://www.facebook.com/notes/facebook-journalists/improving-conversations-on-facebook-with-replies/578890718789613>, Mar. 25, 2013.

(Continued)

*Primary Examiner* — Brian J Gillis
*Assistant Examiner* — Matthew Ballard
(74) *Attorney, Agent, or Firm* — Thomas A. Ward

(57) ABSTRACT

In an implementation, a selection of a program is received by a computing device. The program is associated with a duration of time. In response to the selection, a plurality of messages is retrieved by the computing device. Each message is associated with a time during the duration of time. Playback of the selected program is caused by the computing device on a display associated with the computing device. One or more of the retrieved plurality of messages are presented on the display at the times associated with the messages during the duration of time associated with the program by the computing device.

8 Claims, 10 Drawing Sheets

(56) References Cited

U.S. PATENT DOCUMENTS

| | | | |
|---|---|---|---|
| 2001/0001160 A1* | 5/2001 | Shoff | H04N 5/44543 |
| | | | 725/51 |
| 2005/0262542 A1 | 11/2005 | DeWeese et al. | |
| 2006/0059160 A1* | 3/2006 | Smola | G06F 17/30861 |
| | | | 705/319 |
| 2006/0130109 A1 | 6/2006 | Zenith | |
| 2009/0293079 A1* | 11/2009 | McKee | G06Q 10/105 |
| | | | 725/10 |
| 2010/0318520 A1* | 12/2010 | Loeb | G06F 17/30056 |
| | | | 707/743 |
| 2011/0063503 A1* | 3/2011 | Brand | H04N 5/4401 |
| | | | 348/500 |
| 2012/0151347 A1* | 6/2012 | McClements, IV | G06Q 10/101 |
| | | | 715/716 |
| 2013/0145269 A1* | 6/2013 | Latulipe | G06F 3/048 |
| | | | 715/720 |
| 2013/0332961 A1* | 12/2013 | Ishigaki | H04N 21/482 |
| | | | 725/44 |

OTHER PUBLICATIONS

C. Jennings, "Evolving My Disqus", retrieved from URL <http://blog.disqus.com/page/10>, Oct. 11, 2012.

"Instant Messaging", retrieved from URL <https://support.skype.com/en/category/INSTANT_MESSAGING_WITH_SKYPE/>, on Jun. 11, 2014.

\* cited by examiner

800

RUNWAY CHAT

BACKGROUND

Many internet content providers such as news related websites, blogs, etc. allow users to comment on articles or content items, as well as comment on the comments provided by other users. These comments are typically displayed "inline" where replies are displayed below and offset to their parent comment. In addition, many of the commenting systems allow users to insert links, images, and videos into their comments. Such inline commenting systems allow for conversations or "chats" to be formed with respect to a particular article or content item.

While such commenting systems are successful with respect to text or image based content item, they have not been successfully applied to video content items. First, video content items have an additional time dimension that is not associated with text content items. For example, a viewer may desire to comment on a particular scene of a movie after the scene has ended. Because there is no way to associated comments with particular times during the movie, a later user who views the comment while watching the movie before the scene may either not understand the comment or may have their viewing experience spoiled.

Second, because viewers typically view video content items such as television programs or movies using the full screen of a display, there is often little space to display the comments associated with the video content items. Therefore, facilitating chats or conversations using the inline systems described above may not be effective with respect to video content items, especially where the comments are associated with particular times during the playback of the video content items.

SUMMARY

In an implementation, a selection of a program is received by a computing device. The program is associated with a duration of time. In response to the selection, a plurality of messages is retrieved by the computing device. Each message is associated with a time during the duration of time. Playback of the selected program is caused by the computing device on a display associated with the computing device. One or more of the retrieved plurality of messages are presented on the display at the times associated with the messages during the duration of time associated with the program by the computing device.

Implementations may include some or all of the following features. A message may be received during the playback of the selected program, and may be presented on the display. The received message may be added to the plurality of messages associated with the program. The received message may be a response to a presented one or more of the retrieved plurality of messages. The received message may be associated with the presented one or more of the retrieved plurality of messages, and a graphical representation of the association may be displayed on the display. The graphical representation may be one or more of a chain, an arrow, or a line. In response to the selection, a plurality of promoted content items may be retrieved. Each promoted content item may be associated with a time during the duration of time. One or more of the retrieved plurality of promoted content items are presented on the display at the times associated with the promoted content items during the duration of time associated with the program.

In an implementation, a program is presented in a first region of a display by a computing device. The program is associated with a duration of time. One or more messages of a plurality of messages are presented in a second region of the display. Each message is associated with a time during the duration of time, and the one or more messages are presented at the times associated with the messages during the duration of time associated with the program by the computing device. A new message is received by the computing device. The message is generated by a user associated with the computing device and is associated with a message of the one or more messages of the plurality of messages presented in the second region of the display. The received new message is presented in a third region of the display by the computing device. A graphical representation of the association of the new message and the associated message is presented on the display by the computing device. The graphical representation connects the new message in the third region of the display with the associated message in the second region of the display.

Implementations may include some or all of the following features. The graphical representation may one or more of a chain, an arrow, or a line. Each message of the plurality of messages may be associated with a contact, and presenting one or more messages of the plurality of messages in the second region of the display may include only presenting one or more messages of the plurality of messages in the second region of the display that are associated with contacts that have a social networking relationship with the user associated with the computing device. One or more promoted content items of a plurality of promoted content items are presented in a fourth region of the display. Each promoted content item may be associated with a time during the duration of time. The one or more promoted content items may be presented at the times associated with the promoted content items during the duration of time associated with the program.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIGS. 2-7 illustrate examples of a message display region;

DETAILED DESCRIPTION

Figure 1:
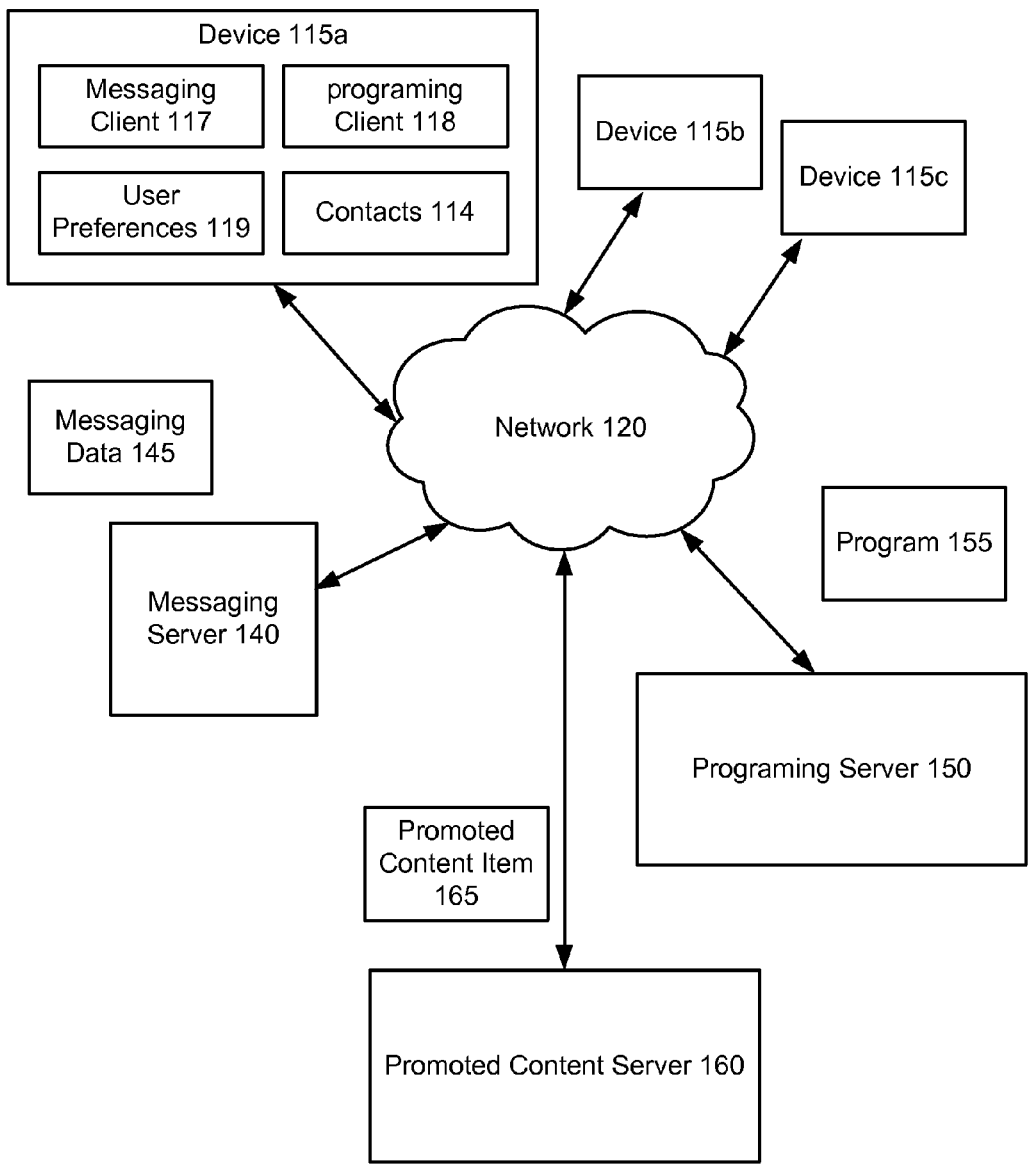
FIG. 1 is a diagram of an exemplary environment in which aspects described herein may be implemented.

FIG. 1 is a diagram of an exemplary environment 100 in which aspects described herein may be implemented. As illustrated, the environment 100 includes devices 115a, 115b, and 115c (collectively referred to as devices 115). The devices 115 may select and/or receive programs 155 from one or programing servers 150 through a network 120. The network 120 may be a variety of network types including the public switched telephone network (PSTN), a cellular telephone network, a cable network, satellite network, and/or a packet switched network (e.g., the Internet or a cloud network). The devices 115 may include a variety of devices such as a set-top box, a laptop or desktop computer, a tablet computer, a smart phone, or a videogame system, for example. While only three devices 115 are shown, it is for illustrative purposes only; there is no limit to the number of devices 115 that may be supported. Each device 115 may be implemented using the computing system 1000 illustrated with respect to FIG. 10.

As shown with respect to the device 115a, each device 115 may include a programing client 118. The programing client 118 may allow a user associated with the device 115 to view and select available programs 155 from the programing server 150. The programing server 150 may then stream the selected program 155 to the device 115, and the programing client 118 may then cause the selected program 115 to be played at the device 115 on a screen or display associated with the device 115. Alternatively, the programing client 118 may download the selected program 155 to storage associated with the device 115, and may cause the downloaded program 155 to be played at the device 115.

Depending on the implementation, the program 155 may be "pushed" to the programing client 118 using one or more channels associated with the programing server 150. The channels may be received through the network 120, or alternatively may be received as part of an over the air (OTA) broadcast. The program 155 may include a variety of video content items including movies, television shows, trailers, and commercials, for example. In some implementations, the device 115 may include digital video recorder (DVR) functionality and may store one or more programs 155 received on one or more of the channels for later viewing by a user.

As shown with respect to the device 115a, each device 115 may further include a messaging client 117. The messaging client 117 may request and/or receive messaging data 145 associated with the program 155 selected and played by the programing client 118. The messaging data 145 may include one or more messages or comments that were, or are currently being, generated by users of the devices 115 with respect to the selected program 155. In addition, the messaging client 117 may allow users of the client devices 115 to generate additional messages and comments with respect to the program 155. These messages may be new messages, or may be replies to existing messages from the messaging data 145. The generated additional messages may be transmitted to the messaging server 140 for storage with the messaging data 145 associated with the program 155 and/or for distribution to any other devices 115 that may also be playing or viewing the program 155.

In some implementations, each program 155 may be associated with duration of time. The duration of time may correspond to the length or the program (e.g., half hour, one hour, or two hours). In addition, each program 155 may have an associated release date and time that corresponds to the date and time when the program 155 was originally released, broadcast, or otherwise made available. In addition, each message of the messaging data 145 may have an associated time. The time may be an offset relative to the duration of time. For example, if the message was generated by a user viewing a program 155 fifteen minutes and ten seconds into the duration of the program 155, then the time associated with the message may be 15 minutes and ten second. In addition, each message may further include the date and time when the message was originally generated.

In some implementations, each message may further be associated with a user or user account. The user account may correspond to an email address, or user account in one or more social networking applications. The social networking applications may be third party social networking applications such a Facebook™ and Twitter™, or may be a proprietary social networking application used by the messaging server 140 and/or messaging client 117.

In some implementations, each message may further include linkage or association data that associates the message with one or more other messages from the messaging data 145. For example, a message may be a reply or response to an existing message. The reply message may be associated with its parent message using a pointer or other data structure.

The messaging client 117 may cause the messages of the messaging data 145 to be displayed during the playback of the program 155. The messages may be displayed in a region of the display associated with the device 115 that is separate from a region of the display 115 that is used to display the program 155 by the programing client 118. Alternatively, the messages may be overlaid or otherwise displayed on top of the program 155.

The messaging client 117 may display messages at a time during the duration of the program 155 according to the associated offsets. For example, if a message has an offset of twenty minutes (indicating that it was generated twenty minutes into the program 155) the message may be displayed by the messaging client 117 on the display associated with the device 115 twenty minutes into the program 155.

As the program 155 progresses, the messages associated with the program 155 may be displayed according their associated offset times. As will be described further with respect to FIGS. 3-7, in some implementations, the messages may scroll through the region of the display used to display the messages according to the offset times. Displayed messages may either be removed from the region of the display after some amount of time has elapsed (or the message reaches an end of the region), or the messages may collect at the end of the region.

In some implementations, related messages may initially be displayed grouped together into what are referred to herein as conversations. A conversation may include two or more messages that are associated to one another as indicated by the link or association data. The association between two messages may represent that one message is a reply to the other message. As may be appreciated, a conversation may be visualized as a tree with nodes that represent messages, and a root node that represents the original message. The child nodes of the tree represent messages that are replies to the messages associated with their respective parent nodes.

In some implementations, a conversation of messages may be represented in the region of the display by displaying the original message with some graphical indication that it is a conversation. For example, the message may be displayed with an adjacent number that conveys the number of messages in the conversation, and/or the message may be displayed such that the other messages in the conversation appear to be stacked or hidden behind the original message.

To view the other messages in the conversation, the user of the messaging client 117 may select the message representing the conversation using a user interface element such as a mouse or through a touch screen. For example, the user may make a gesture on the display such as a pinching or opening gesture to expand the conversation. The messages in the conversation may then be presented in the region of the display associated with the device 115 by the messaging client 117. Depending on the implementation, any messages in the region that are not part of the expanded conversation may be greyed out, hidden, or otherwise indicated to be not part of the expanded conversation by the messaging client 117.

The messaging client 117 may display the messages of the conversation in the region so as to indicate the association between messages. For example, the messages of the conversation may be displayed inline such that a user of the device 115 can see the relationships between the messages in the conversation such as which message each message is a reply to. In another example, the messages may be "linked" to the messages that they depend from using a graphic such as a chain, a rope, an arrow, or a line. Other graphical representations may be used.

Depending on the implementation, the messaging client 117 may initially expand a selected conversation in levels. For example, the messaging client 117 may initially display all the messages that are direct replies to the original message of the conversation. Messages of the conversation that are replies to these replies may then be displayed as sub-conversations and may include graphical indications of the number of messages in each sub-conversation. The user may then expand each sub-conversation similarly as described above.

The messaging client 117 may further allow the user to respond to displayed messages. Depending on the implementation, the user may select the message that they wish to reply to and may then enter text using a user interface element though a keyboard (software or physical) associated with the device 115. The message may then be associated with an offset time by the messaging client 117 and may be displayed on the display of the device 115. In addition, the message may be added to the messaging data 145 and may be provided to the messaging server 140 by the messaging client 117.

As will be described further with respect to FIGS. 3-7, when the message is displayed by the messaging client 117, it may be displayed in a region of the display that is reserved for messages generated by the user associated with the device 115. Depending on the implementation, this region may be adjacent to the region of the display used to display the other messages. In addition, similarly as described above, the graphical link may be displayed between the displayed message and the message that it is a reply to.

The messaging client 117 may further receive and display promoted content items 165. The promoted content items 165 may be received from a promoted content server 160 and may include links (URLs), images, videos, and other content items that are recommended or promoted by users while viewing the program 155. In addition, promoted content items 165 may include advertising content provided by one or more advertisers or content related to the program 155 that is being viewed. Other types of content may be supported.

Similar to the messages, each promoted content item 165 may be associated with an offset time that indicates both when the promoted content item 165 was promoted or recommended by a user, and when the promoted content item 165 may be displayed during playback of the program 155. As will be described further with respect to FIGS. 3-7, the messaging client 117 may display the promoted content item 165 in a region of the display reserved for promoted content items 165.

Similarly as with messages, the promoted content items 165 may be displayed in the corresponding region according to the times associated with the promoted content items 165 and the current time of program 155 being played. The promoted content item 165 may then move or scroll through the corresponding region during playback of the program 155. A user may then select a piece of promoted content by "touching" the displayed content or by using a user interface device such as a mouse or keyboard. Depending on the selected promoted content 165, a video or webpage may be displayed in the same or different region of the display as the promoted content item 165.

In some implementation, the messaging client 117 may operate according to one or more user preferences 119. The user preferences 119 may control the types of messages from the message data 145 and/or the promoted content items 165 that are displayed on the display associated with the device 115 during the playback of the program 155. The user preferences 119 may further control the size and location of the various regions used to display the messages and promoted content items 165 on the display.

For example, in some implementations, the user preferences 119 may allow a user to specify whether they want to receive messages from all users or only from users that they know or have a social networking relationship with. These users may be indicated by the contacts 114. The user may further select which users from the contacts 114 that they wish to view messages and/or promoted content items 165 from, as well as which users can view the messages and/or promoted content items 165 that the user creates or generates. Other types of user preferences 119 may be supported.

Figure 2:
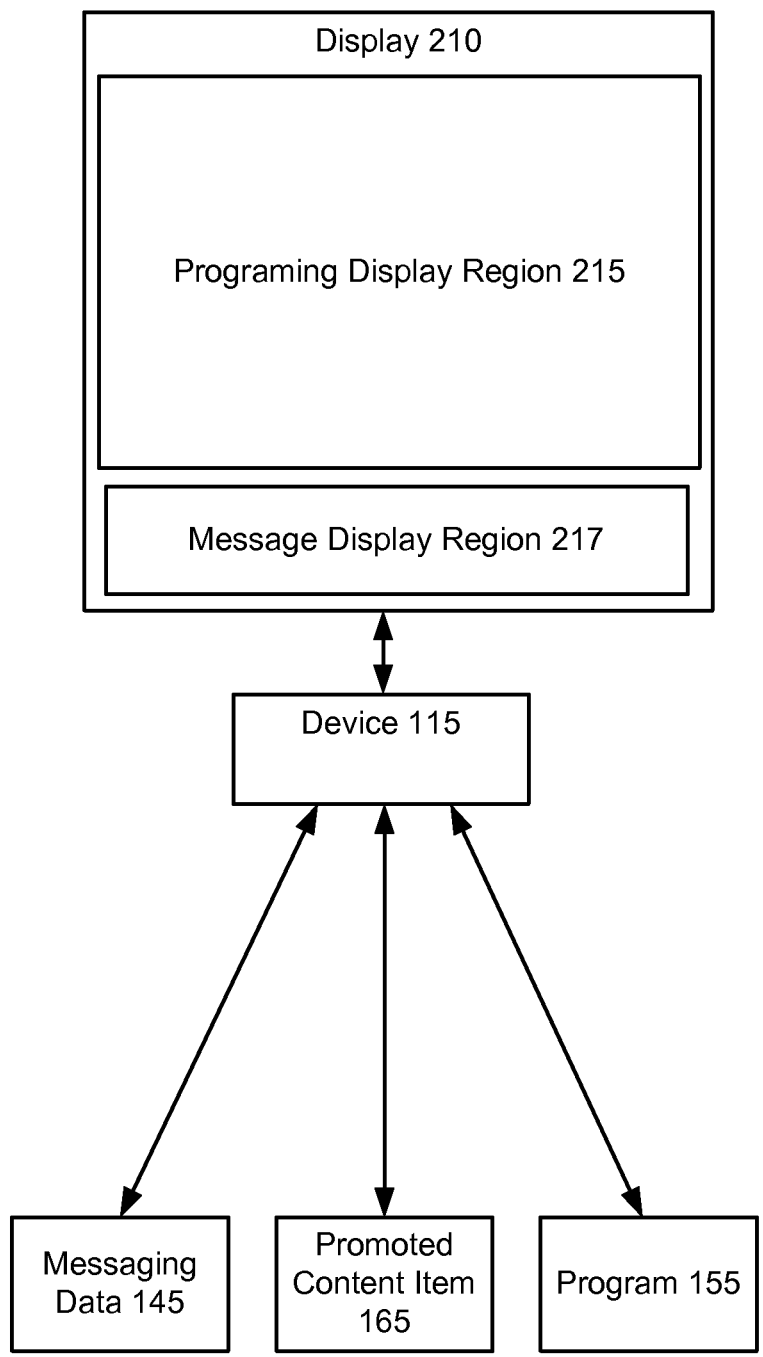
FIG. 2 is an illustration of another environment in which aspects described herein may be implemented.

FIG. 2 is an illustration of an environment 200 in which aspects described herein may be implemented. As shown, the environment 200 includes a device 115 that receives one or more of messaging data 145, programs 155, and promoted content items 165. The data may be received from one or more of the messaging server 140, programing server 150, and the promoted content server 160. Note that while the messaging server 140, programing server 150, and the promoted content server 160 are illustrated as three separate components in FIG. 1, each of the servers may be implemented using the same or different computing devices such as the computing system 1000 illustrated in FIG. 1.

As shown in FIG. 2, the device 115 is connected to a display 210. The display 210 may be a touch enabled display 210, or a non-touch display 210. In some implementations, the display 210 may be an external display and may be separate from the device 115. These implementations may include implementations where the device 115 is a set-top box, desktop computer, DVR, videogame system, or other home entertainment appliance.

In other implementations, the display 210 may an integrated display and may be part or the device 115. These implementations may include implementations where the device 115 is a personal digital assistant, tablet computer, smart phone, smart television, laptop computer, or portable videogame system, for example.

The display 210 may be divided into two regions: a programing display region 215; and a message display region 217. The programing display region 215 may be used by the programing client 118 to playback programing content 155. The message display region 217 may be used to display messages and/or promoted content 165 associated with the program 155.

The size and locations of each of the programing display region 215 and the message display region 216 may be controlled by the user associated with the device 115 though the user preferences. For example, the message display region 217 may be alternatively placed on along the top, or along either side of the display 210, and can be adjusted to take up a larger or smaller percentage of the display 210.

FIGS. 2-7 illustrate examples of the message display region 217 during playback of a program 155. As shown the message display region 217 is divided into three smaller regions or "runways" 219a, 219b, and 219c (collectively referred to herein as runways 219). While three runways 219 are shown, it is for illustrative purposes only; more or fewer runways 219 may be supported.

In the implementation shown, each of the runways 217 is used to display a different type of content item. The runway 219a is used to display promoted content items 165 (e.g., promoted content items 165a-165d); the runway 219b is used to display messages from users other than the user associated with the device 115 (e.g., messages 301 and 303); and the runway 219c is used to display messages generated by the user associated with the device 115 (e.g., the message 301).

The runways 219 are referred to as runways because as the current time associated with the program 155 being played in the programing display region 215 advances, the messages and/or promoted content items 165 associated with the current time appear at the bottom of their respective runways 219 and begin to advance towards the top of their respective runways 219. The messages and/or promoted content items 165 may then either exit their respective runways 219 when they reach the top, or may bunch or cluster together at the top of the runways 219. Whether the messages and/or promoted content items 165 exits a runway 219 may depend on the number of messages and/or promoted content items 165 associated with the program 155 or user preferences 119. Similarly, the speed at which the promoted content items 165 and/or messages move through the runways 219 may also depend on the number of messages and/or promoted content items 165 associated with the program 155 or user preferences 119.

Alternatively, the messages and/or promoted content items 165 associated with the current time may appear at the top of their respective runways 219 and may begin to advance towards the bottom of their respective runways 219. The direction that the messages and/or promoted content items 165 advance through the runways 219 may be configurable by the user associated with the device 115 as part of the user preferences 119.

Figure 3:
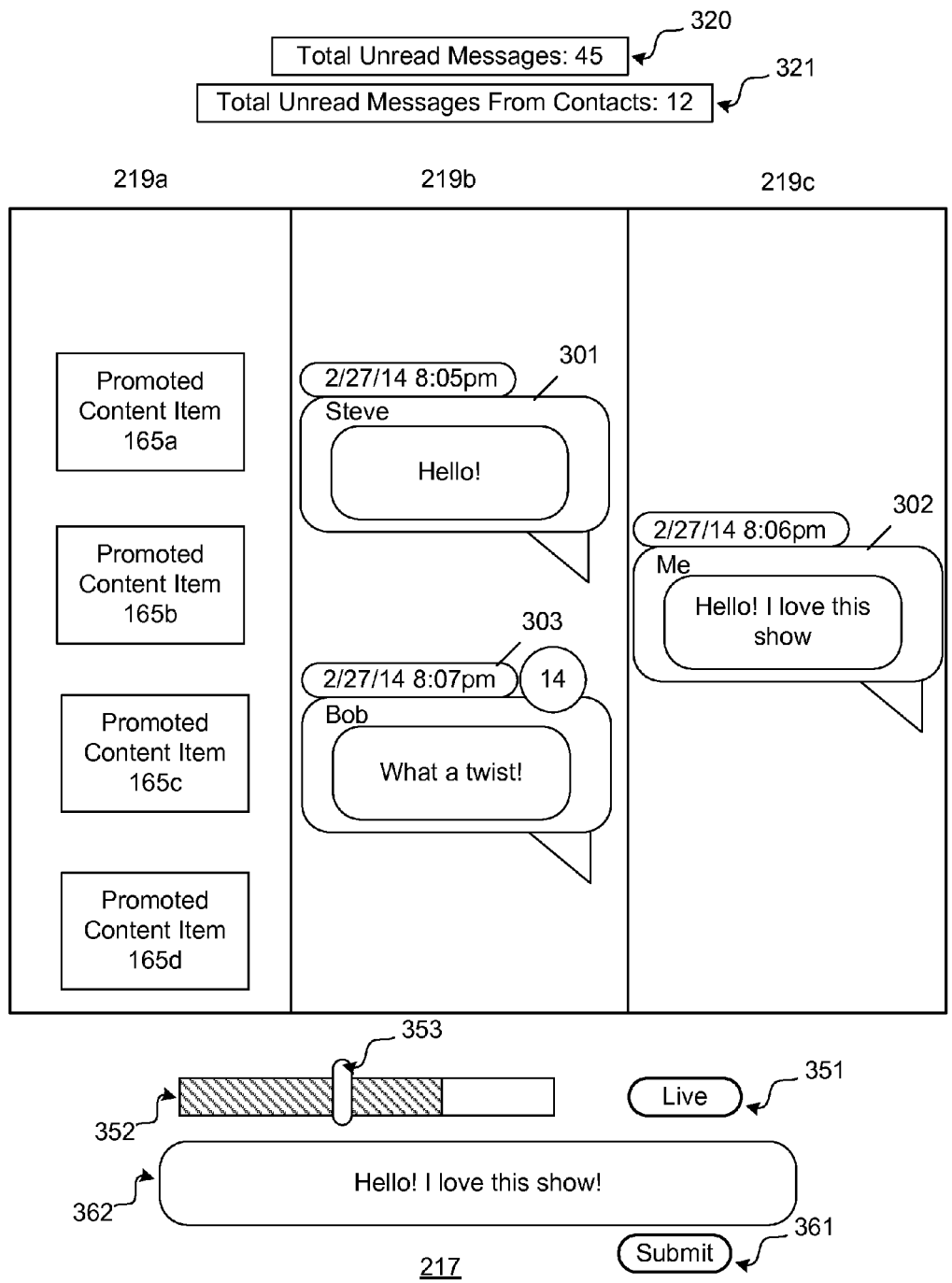

The message display region 217 of FIG. 3 further includes user interface elements 320 and 321 showing the number of unread messages associated with the program 155. The user interface element 320 shows the total number of unread messages, while the user interface element 321 shows the total number of unread messages from contacts associated with the user. Depending on the implementation, the unread messages may be the total unread messages associated with the program 155, or may be the total unread messages associated with the program 155 that have a time that is before a current time associated with the program 155. For example, if the user is thirty minutes into the program 155 the user interface elements 320 and 321 may only reflect unread messages that were generated by users in the first thirty minutes of the program 155.

The message display region 217 of FIG. 3 may further include user interface element 352 which may be used to show the remaining amount of time in the duration of the program 155 being viewed in the programing display region 215. In the example shown, the marker 353 represents the current time in the program 155.

In some implementations, the user can move back or forward in time with respect to the program 155 by moving the marker 353 forward or backwards. In response the messages and/or promoted content items 165 displayed in the runways 219 may be adjusted to correspond to the selected time within the program 155.

Where the program 155 being viewed is currently being broadcast, and the user is viewing the program time delayed, the region 217 may further include a user interface element 351 that may allow the user to catch up to the live broadcast. If activated, the program 155 shown in the programing display region 215 may jump to the most recent time in the live broadcast, and the messages and/or promoted content items 165 in the runways 219 may be updated to include the most recently generated messages and/or promoted content items 165. In such implementations, the progress of the live program 155 is reflected in the hashed regions of the user interface element 352.

The message display region 217 of FIG. 3 may further include a text entry box 362. The text entry box 362 may allow the user to enter text for one or more messages. The user may then submit the message by activating the "Submit" button 361. Other types of user interface elements may be used.

By way of example, FIG. 3-7 illustrates a hypothetical sequence of messages and promoted content items 165. A user associated with the device 115 has begun viewing a program 155. Runway 219a displays the promoted content items 165a-165d that are associated with times that have elapsed so far in the program 155.

In the runway 219b two messages 301 and 303 have been displayed. The message 301 is authored by "Steve" and includes the text "Hello!". The date associated with the message 301 indicates that the message was originaly generated by Steve at 8:05 pm on Feb. 27, 2014.

The message 303 is authored by "Bob" and includes the text "What a twist!". The date associated with the message 303 indicates that the message was generated by Bob at 8:07 pm on Feb. 27, 2014. In addition, the message 303 includes the number 14 that indicates that the message 303 is part of a conversation with at least 14 associated messages.

The runway 219c is used to display messages generated by the user associated with the device 115, and includes the message 302. As illustrated, the user has used the text box 362 to enter the text "Hello! I love this show!" and has activated the button 361. In response the message 302 was generated in the runway 219c. Because the message 302 was generated at a time that was before the message 303, the message 302 is displayed ahead of the message 303 in the runway 219c.

At a later time, the user may desire to view the conversation associated with the message 303. In some implementations, the user may select and expand the message 303 by using a pinch or open finger type gesture. Other types of gestures and indications may be used depending on the type of display 210 that is associated with the device 115.

Figure 4:
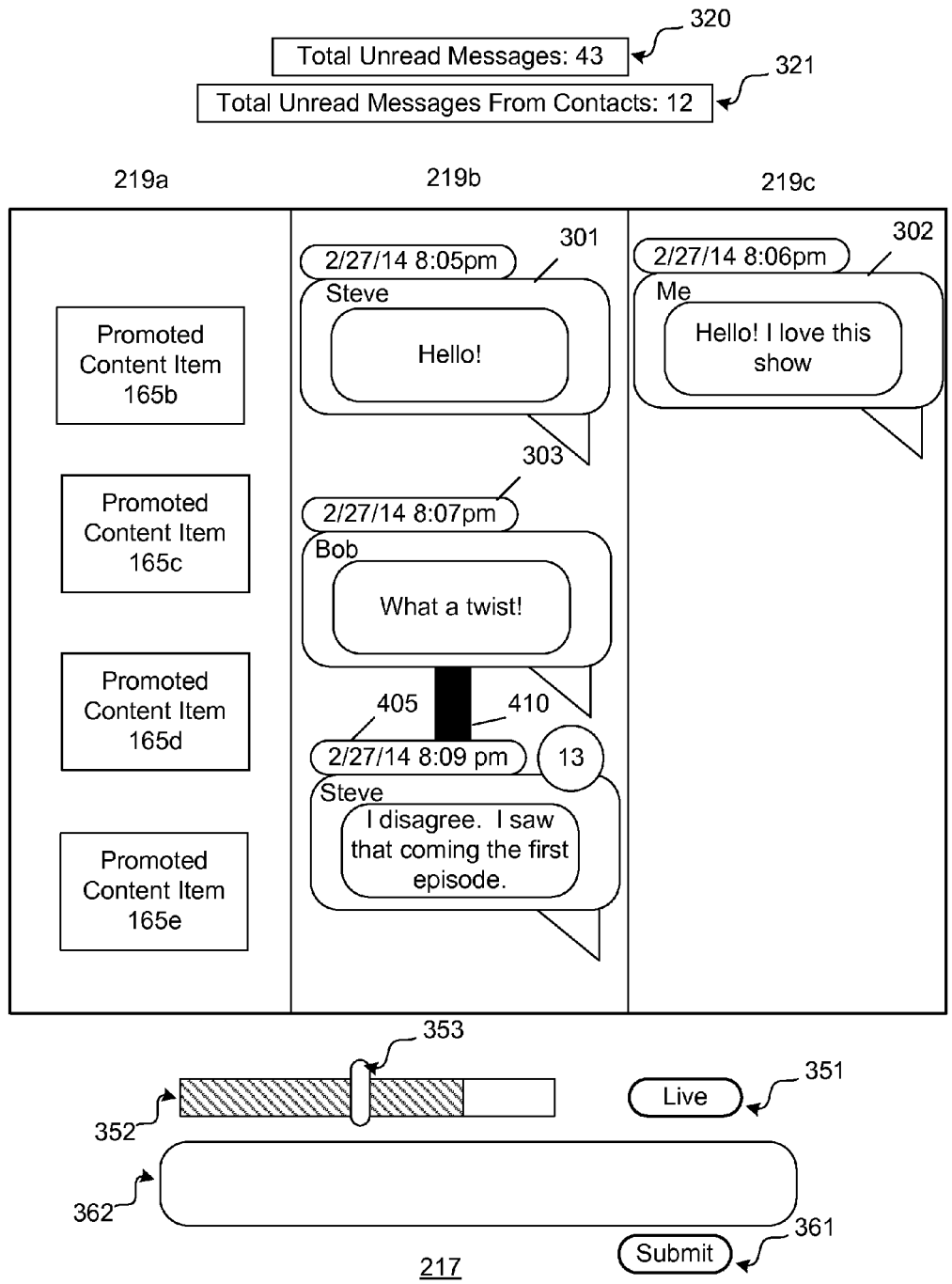

In response to the selection, FIG. 4 illustrates the expanded conversation associated with the message 303. The message 303 has been expanded to further include the displayed message 405. In addition, a graphical representation 410 of the association between the message 303 and 403 has been added to the runway 219b to show the association. While not shown in this example, when expanding a particular message, the other messages and/or promoted content 165 in the runways 219 may be blurred or greyed out to allow the user to focus on the conversation associated with the expanded message.

In the example shown, the message 405 is the only direct reply to the message 303. There are 13 additional replies to the message 405 that are indicated by the number 13 displayed on the message 405. If the user desires to read those replies the user may expand the message 405 similarly as described above with respect to the message 303.

As may be appreciated, because additional time has elapsed in the program 155, the promoted content items 165 have advanced in the runway 219a such that promoted content 165a is no longer displayed, and promoted content 165e has entered the runway 219a. Similarly, the messages 301, 302, and 303 have advanced in their respective runways 219.

Figure 5:
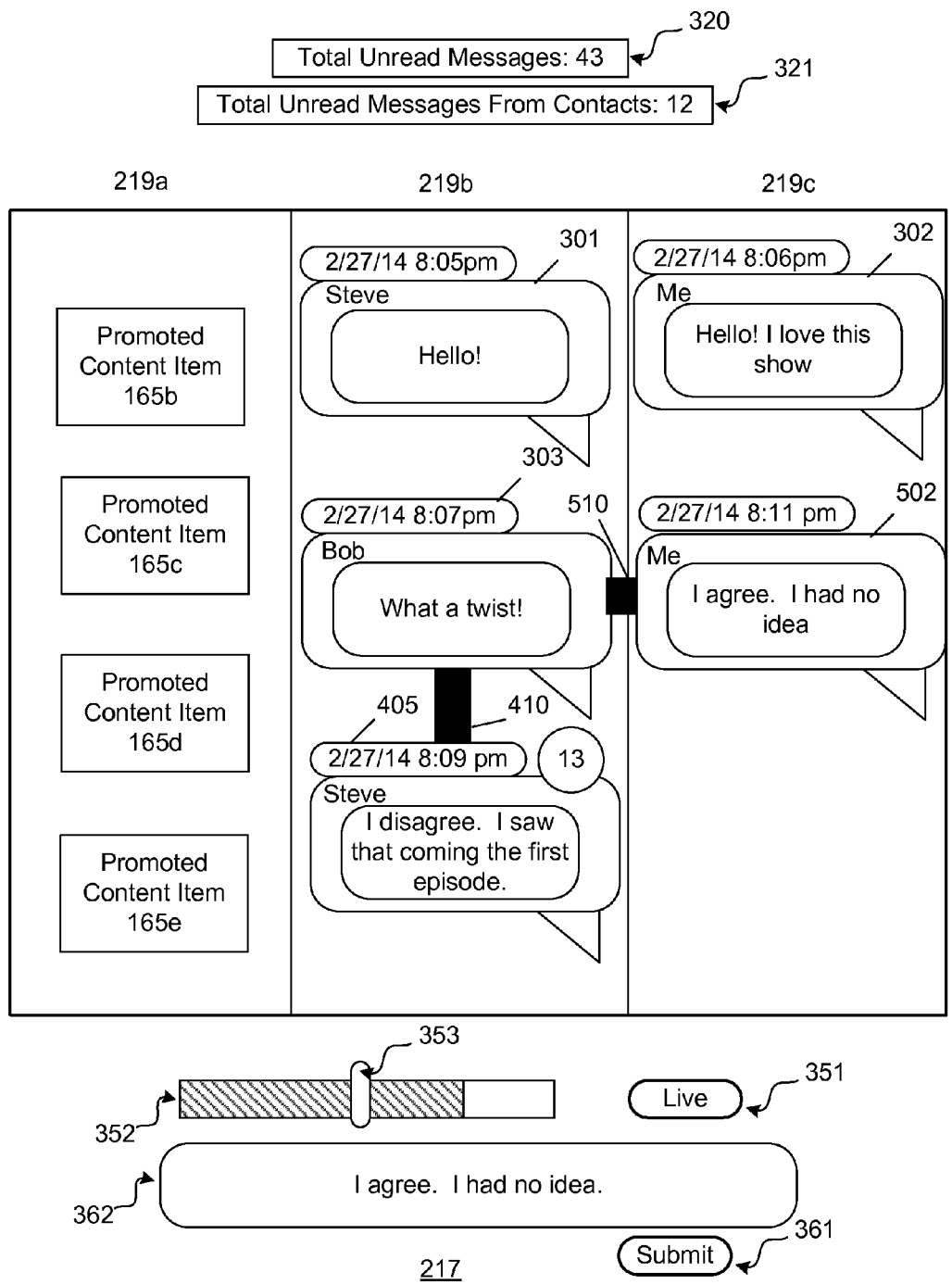

Continuing to FIG. 5, the user may desire to respond to the message 303. Accordingly, depending on the implementation, the user may select the message 303 by touching the message 303, or by using a mouse, keyboard, or other input device. After selecting the message 303, the user may type the desired response into the text box 362, and may generate the response by actuating the submit button 361.

In the example shown in FIG. 5, the user has entered the text string "I agree. I had no idea." into the text box 362 and has actuated the submit button 361. In response, a message 502 is generated and displayed in the runway 219c that includes the entered string. In addition, a graphical representation 510 is displayed in both the runways 219b and 219c that shows that the message 502 is a reply to the message 303.

Figure 6:
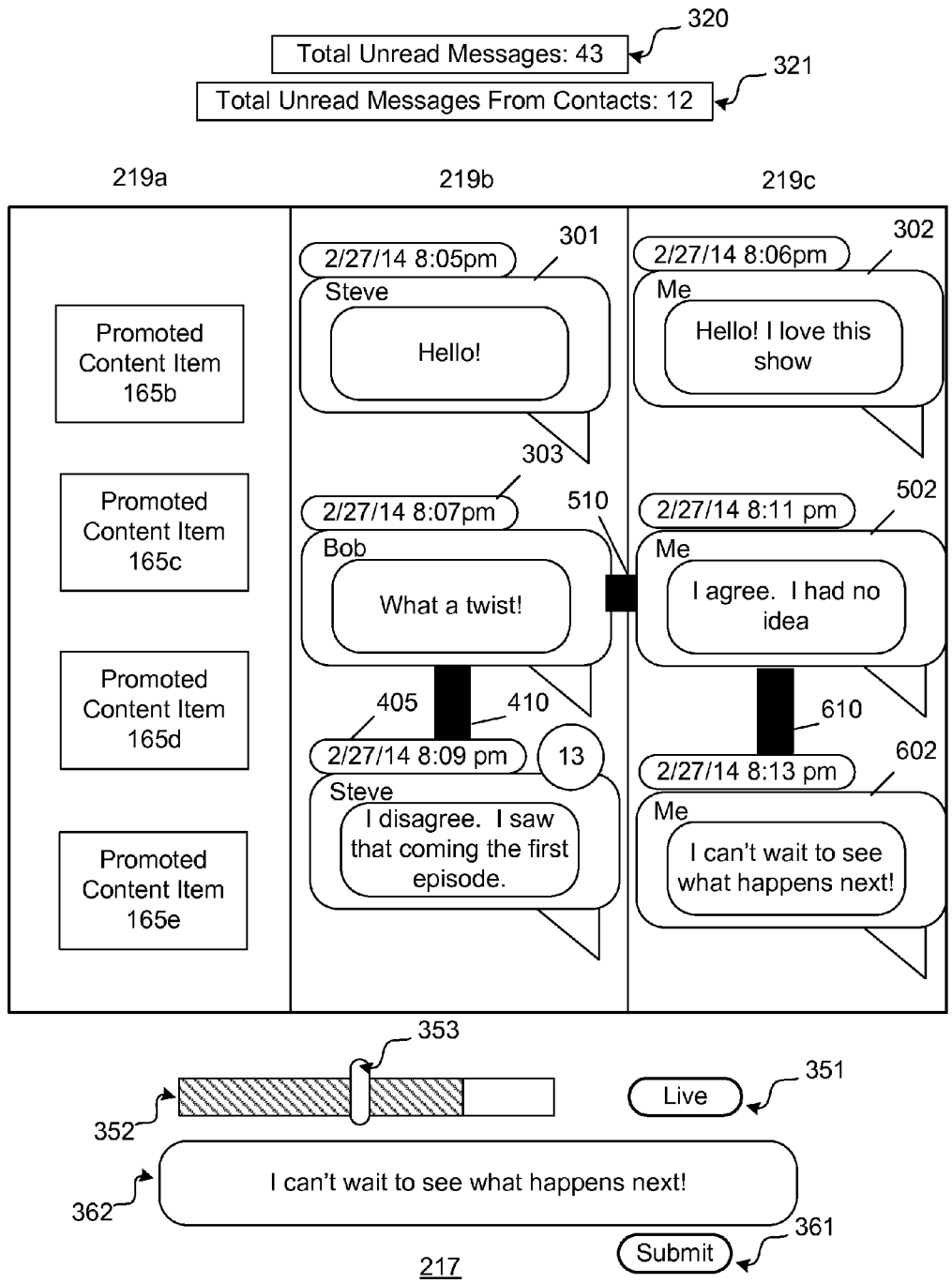

Continuing to FIG. 6, the user may desire to respond or follow up to their own message 502. Accordingly, depending on the implementation, the user may select the message 502 and may generate the response as described above.

In the example shown in FIG. 6, the user has entered the text string "I can't wait to see what happens next!" into the text box 362 and has actuated the submit button 361. In response, a message 602 is generated and displayed in the runway 219c that includes the entered string. In addition, a graphical representation 610 is displayed in the runway 219c that shows that the message 602 is a reply to the message 502.

Figure 7:
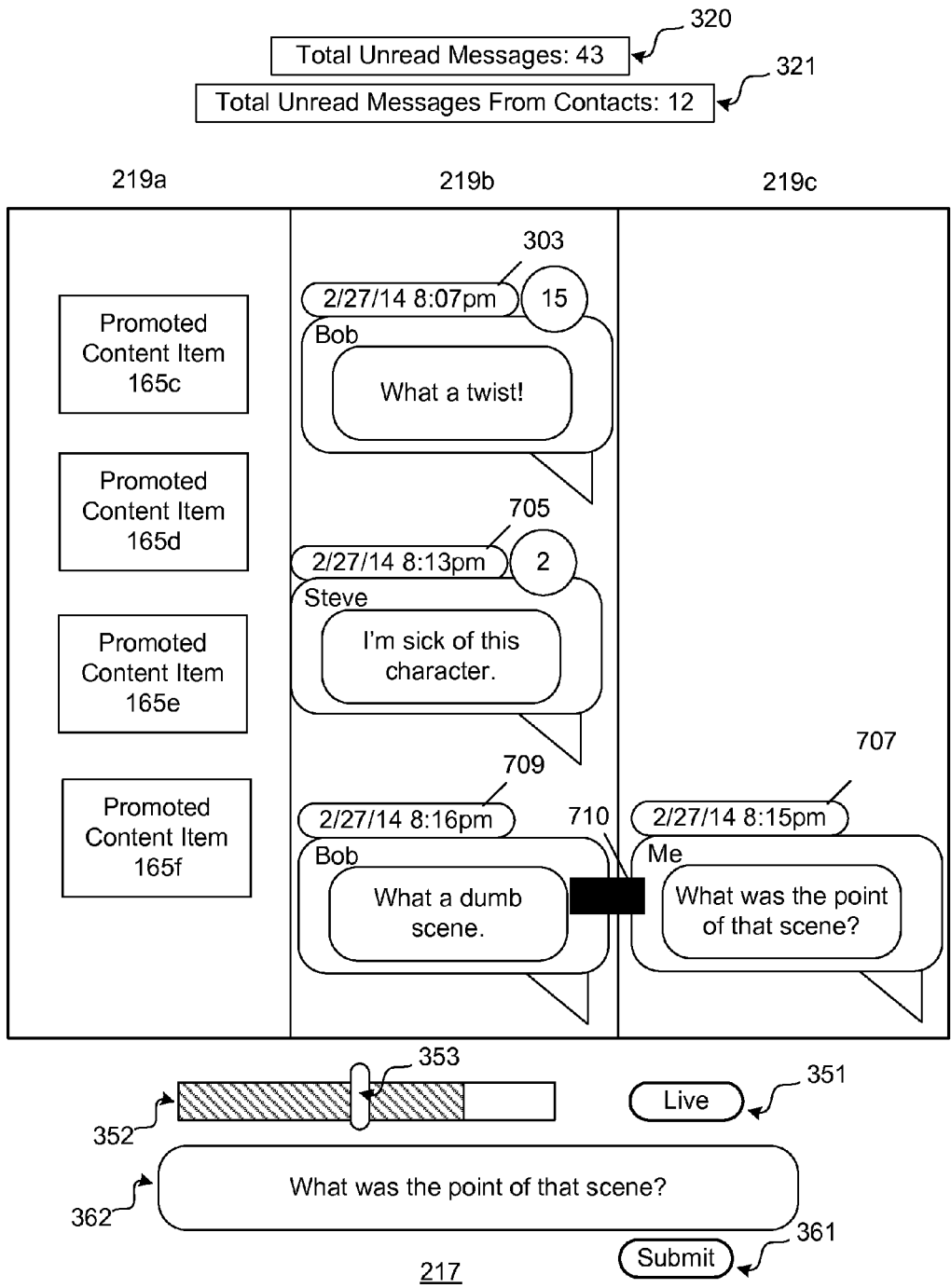

Continuing to FIG. 7, the user may no longer wish to view the conversation associated with the message 303. In some implementations, the user may select and compact the conversation associated with the message 303 using a pinch type gesture. Other types of gestures and indications may be used depending on the type of display 210 that is associated with the device 115.

In response to the selection, FIG. 7 shows the messages 602, 502, and 410 have been compressed back into the message 303 in the runway 219b. The graphic indicating the number of messages in the conversation has been updated to 15 from 14 to reflect the additional message 502 generated by the user associated with the device 115.

In addition, the runways 219a and 219b have been updated based on the time that has further elapsed in the program 155. As shown, the runway 219a has been updated to display promoted content item 165f, and promoted content item 165b is no longer displayed. Similarly, the runway 219b has been updated to include the new messages 705 and 709.

The user may desire to respond to the message 709. Accordingly, depending on the implementation, the user may select the message 709 and may generate the response as described above.

In the example shown in FIG. 7, the user has entered the text string "What was the point of that scene?" into the text box 362 and has actuated the submit button 361. In response, a message 707 is generated and displayed in the runway 219c that includes the entered string. In addition, a graphical representation 710 is displayed in the runway 219c and 219b that shows that the message 707 is a reply to the message 709.

Figure 8:
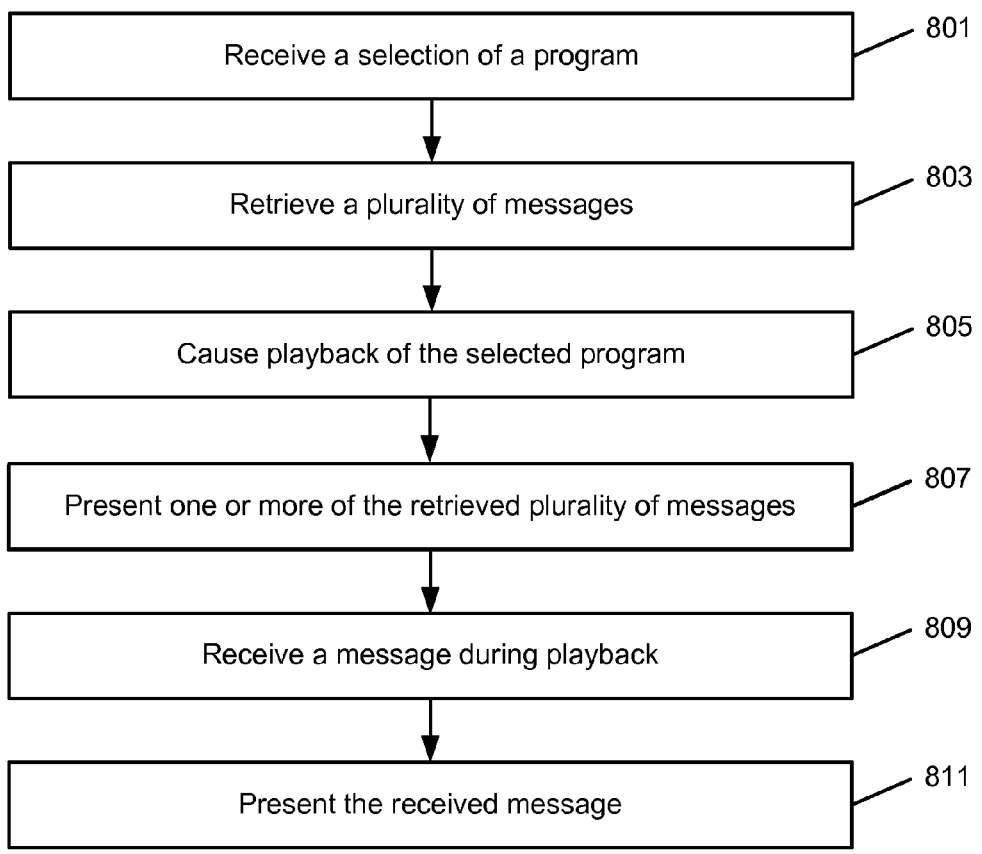
FIG. 8 is an operational flow of an implementation of a method for presenting a plurality of messages during playback of a program.

FIG. 8 is an operational flow of an implementation of a method 800 for presenting a plurality of messages during playback of a program 155. The method 800 may be implemented by messaging client 117 and/or the programing client 118 of the device 115.

A selection of a program is received by a computing device at 801. The program 155 may be selected by a user through the programing client 118. The program 155 may be stored and/or made available by a programing server 150. The program 155 may be a video content item such as a movie or television program and may be associated with a duration or length of time. The computing device may be the device 115 and may be one or more of a set-to-box, a tablet computer, a mobile phone, videogame system, or a laptop computer.

A plurality of messages is retrieved at 803. The retrieved messages are associated with the selected program 155, and may be retrieved by the messaging client 117 from the messaging server 140. Each message is associated with a time during the duration of time associated with the program 155 that may represent the relative time during the program 155 at when the message was generated. Each message may have been generated by a user of a social networking application, for example.

Playback of the selected program is caused at 805. The playback may be caused by the programing client 118 of the device 115. The program 155 may be played back in a region of a display associated with the device 115 such as the programing display region 215.

One or more of the retrieved plurality of messages are presented at 807. The one or more of the retrieved plurality of messages may be presented by the messaging client 117 of the device 115 in a region of a display associated with the device 115 such as the message display region 217. The messages may be presented or displayed at the time associated with the message during the playback of the program 155. In some implementations, each message may be displayed in a runway 219.

A message is received during playback at 809. The message may be generated by the user that selected the program 155 for playback using the messaging client 117. The message may be a response or reply to one of the presented messages in the message display region 217.

The received message is presented at 811. The received message may be presented or displayed by the messaging client 117 of the device 115 in message display region 217. In some implementations, the received message may be presented in a different raceway 219 of the message display region 217 than the presented one or more of the plurality of messages. In addition, a graphical representation of the relationship or association between the received message and the message that it is a reply or response to may be presented in the runway 219 of the message display region 217. The graphical representation may be one or more of a chain, an arrow, or a line that visually connects the messages to one another. Other graphical representations may be used.

Figure 9:
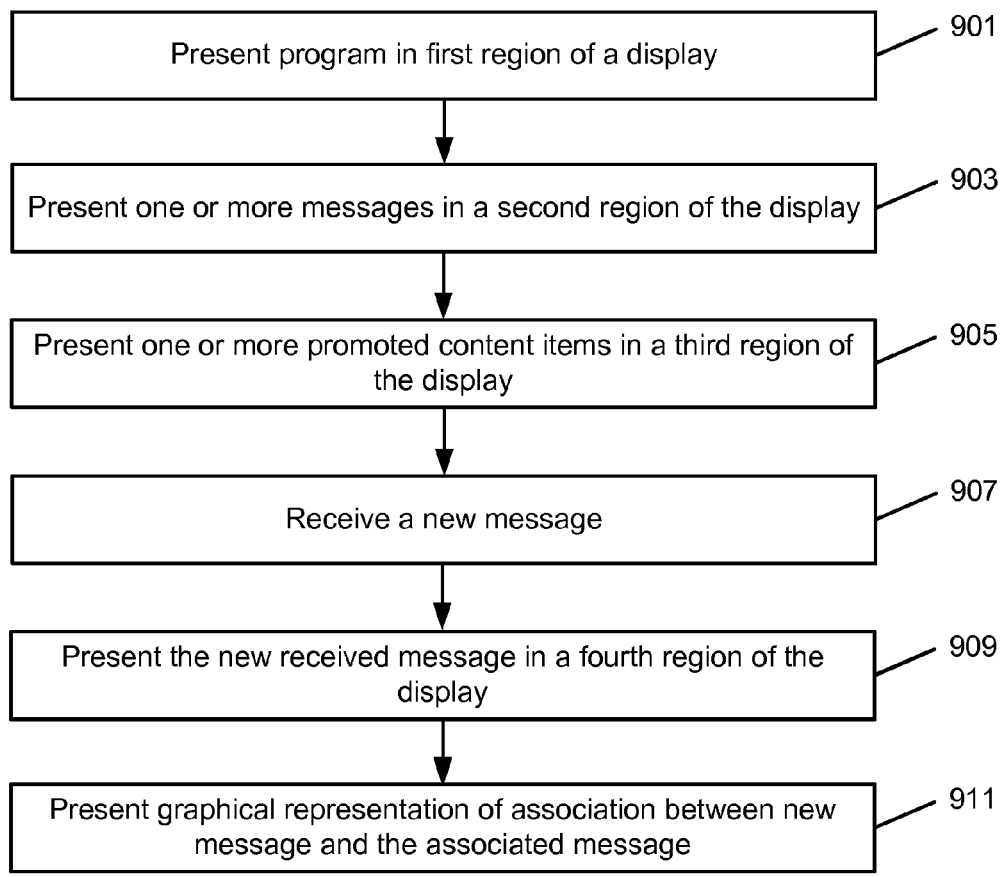
FIG. 9 is an operational flow of an implementation of a method for presenting a plurality of messages and promoted content items during playback of a program.

FIG. 9 is an operational flow of an implementation of a method 900 for presenting a plurality of messages and promoted content during playback of a program 155. The method 900 may be implemented by messaging client 117 and/or the programing client 118 of the device 115.

A program is presented in a first region of a display at 901. The program 155 may be a video content item and may be presented by the programing client 118 of the device 115. The program 155 may be associated with a duration of time. The first region of the display may be the programing display region 215.

One or more messages are presented in a second region of a display at 903. The one or more messages may be presented in a second region of the display such as the runway 219b of the message display region 217 by the messaging client 117. Each message may be associated with a time during the duration of time associated with the program 155. Each message may be presented or displayed in the second region at the associated time during the duration of time. For example, if a message was originally generated by a user twelve minutes into the duration of time associated with program 155, then the message may be presented in the runway 219b twelve minutes into the playback of the program 155.

One or more promoted content items are presented in a third region of the display at 905. The promoted content items 165 may be content items that are promoted by one or more users of a social networking application during the program 155 and may include images, URLs, videos, and commercials. Similar to the messages, each promoted content item 165 may be associated with a time and may be presented during that time during the playback of the program 155. The one or more promoted content items may be presented in the runway 219a by the messaging client of the messaging client 117.

A new message is received at 907. The new message may be received from a user of the device 115 through the messaging client 117. The new message may be associated with one of the messages presented in the second region of the display. For example, the new message may be a reply to a message presented in the second region of the display.

The new received message is presented in a fourth region of the display at 909. The new received message may be presented in the fourth region of the display by the messaging client 117 of the device 115. The fourth region of the display may be the runway 219c and may be reserved for presenting messages generated by the user associated with the device 115.

A graphical representation of the association between the new message and the associated message is presented at 911. The graphical representation may be presented by the messaging client 117 of the device 115. The graphical representation may be a chain, link, arrow, line, rope etc. The graphical representation may connect the new message and the associated message (i.e., the message that the new message is a reply to) and may span both of the second and the fourth regions of the display (e.g., the runway 219b and the runway 219c).

Figure 10:
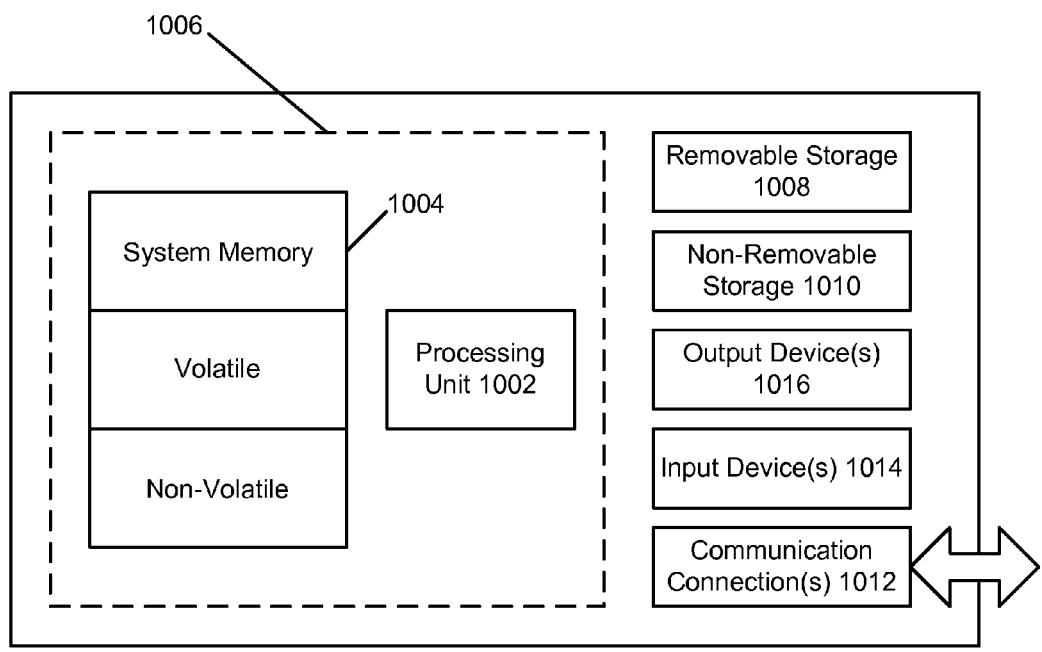
FIG. 10 is a block diagram of a computing system environment according to an implementation of the provided system.

FIG. 10 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing system 1000. In its most basic configuration, computing system 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing system 1000 may have additional features/functionality. For example, computing system 1000 may include additional storage (removable and/or non-removable) including, but not limited to, magnetic or optical disks or tape. Such additional storage is illustrated in FIG. 10 by removable storage 1008 and non-removable storage 1010.

Computing system 1000 typically includes a variety of computer readable media. Computer readable media can be any available media that can be accessed by computing system 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 1000. Any such computer storage media may be part of computing system 1000.

Computing system 1000 may contain communication connection(s) 1012 that allow the device to communicate with other devices. Computing system 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

What is claimed:

1. A method comprising:
   receiving a selection of a program by a computing device, wherein the program is associated with a duration of time;
   in response to the selection, retrieving a plurality of messages by the computing device, wherein each message is associated with a time during the duration of time;
   causing playback of the selected program by the computing device on a display associated with the computing device;
   presenting one or more of the retrieved plurality of messages on the display at the times associated with the messages during the duration of time associated with the program by the computing device;
   in response to the selection, retrieving a plurality of promoted content items, wherein each promoted content item is associated with a time during the duration of time;
   presenting one or more of the retrieved plurality of promoted content items on the display at the times associated with the promoted content items during the duration of time associated with the program;
   receiving a message during the playback of the selected program; and
   presenting the received message on the display, wherein the received message is a response to a presented one or more of the retrieved plurality of messages, and further comprising:
   associating the received message with the presented one or more of the retrieved plurality of messages; and
   displaying a graphical representation of the association on the display.

2. The method of claim 1, further comprising adding the received message to the plurality of messages associated with the program.

3. The method of claim 1, wherein the graphical representation is one or more of a chain, an arrow, or a line.

4. The method of claim 1, wherein each promoted content item comprises one or more of a video, graphic, or a uniform resource locator.

5. The method of claim 1, wherein the program comprises a video, and the computing device comprises one or more of a set-top box, a tablet computer, a mobile phone, a videogame system, or a laptop computer.

6. A system comprising:
   a set-top box adapted to:
   retrieve a plurality of messages associated with a selected program, wherein each message is associated with a time during a duration of time associated with the selected program;
   cause playback of the selected program in a first region of a display associated with the set-top box;
   present one or more of the retrieved plurality of messages on a second region of the display at the times associated with the messages during the duration of time associated with the program;
   retrieve a plurality of promoted content items, wherein each promoted content item is associated with a time during the duration of time;
   present one or more of the retrieved plurality of promoted content items in a third region of the display at the times associated with the promoted content items during the duration of time associated with the program;
   receive a message during the playback of the selected program; and
   present the received message in a third region of the display, wherein the message is received from a user associated with the set-top box, wherein the received message is a response to a presented one or more of the retrieved plurality of messages, and the set-top box is further adapted to;
   associate the received message with the presented one or more of the retrieved plurality of messages; and
   display a graphical representation of the association on the display.

7. The system of claim 6, wherein the set-top box is further adapted to add the received message to the plurality of messages associated with the program.

8. The system of claim 6, wherein the graphical representation is one or more of a chain, an arrow, or a line.

* * * * *